Figure 6:
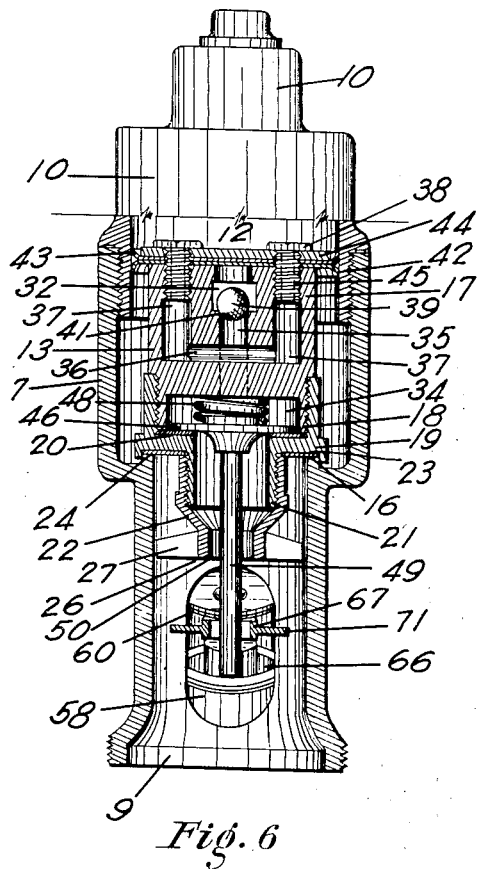

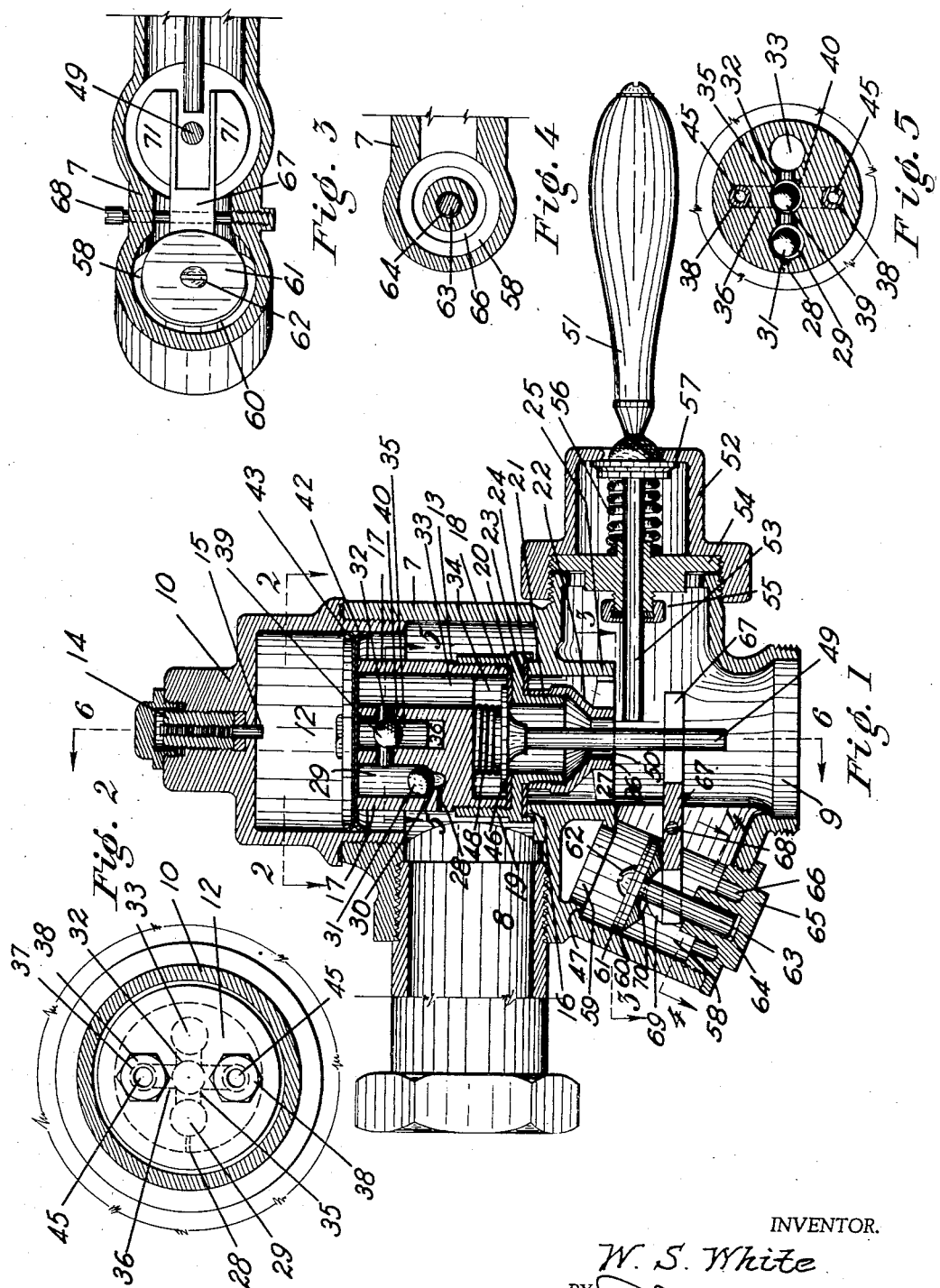

Dec. 19, 1939.   W. S. WHITE   2,183,601
FLUSHING VALVE
Filed May 8, 1934   2 Sheets-Sheet 2

INVENTOR.
W. S. White
BY
ATTORNEY.

Patented Dec. 19, 1939

2,183,601

UNITED STATES PATENT OFFICE 2,183,601

FLUSHING VALVE

William S. White, Denver, Colo.

Application May 8, 1934, Serial No. 724,483

18 Claims. (Cl. 137—93)

My invention relates to flush valves and more particularly to valves of the type in which a manually-actuated lever effects an opening of the valve, which operates automatically thereafter to deliver a measured flow of water to a fixture to be flushed, the valve automatically closing at the end of the flushing period.

An object of the invention is to provide, in valve-structures of the above-described character, a free flow of air between a main controlling valve and a bowl flushing connection to prevent the formation of a partial vacuum in the valve-structure and positively prevent any siphoning of polluted water from the bowl, which, if unchecked, might penetrate into and contaminate the water supply.

Another object of the invention is the provision of a valve in the air-intake which automatically seals the intake-opening during the flushing operation to prevent the escape of the flushing water.

A further object of the invention is the provision of a valve having means to seal a passage to thereby prevent a reverse flow of water thru the same, and still other objects are found in details of construction, as will be fully and clearly brought out in the course of the following description.

In the accompanying drawings, in the several views of which like parts have been similarly designated, Figure 1 represents a sectional elevation of a valve assembly embodying the features of the present invention;

Figure 2, a section taken along the line 2—2, Figure 1;

Figure 3, a section taken along the line 3—3, Figure 1;

Figure 4, a section taken along the line 4—4, Figure 1;

Figure 5, a section taken along the line 5—5, Figure 1; and

Figure 6, a section taken along the line 6—6, Figure 1.

Referring further to the drawings, the valve casing, indicated by the reference numeral 7, is provided with an inlet port 8 and an outlet 9. A screw cap 10 fitted on the upper end of the casing 7 has a cylindrical interior providing a control chamber 12 in which a piston element 13 reciprocates. Centrally of the screw cap 10, a threaded stop-element 14 is fitted to position a lengthwise adjustable stop 15 at an end of the control chamber to limit upward movement of the piston element 13.

Between the inlet 8 and the outlet 9 the casing is provided with an annular valve seat 16, cooperating with the piston element 13, which normally rests thereon, to control the flow of water between the inlet and the outlet.

The piston in its preferred form consists of a cylindrical body 17 threaded at its lower end 18. A flanged collar 19 fits upon the threaded end 18 with an annular, resilient washer 20 in the collar 19, held against the end 18 of the cylinder. The reduced end 21 of the collar has a screw connection with a guide-element 22 and an annular groove 23 in the collar adjoining the flange 21 contains a resilient washer 24 which is held therein by the guide-element 22, the washer serving as a yielding cushion on the valve seat 16.

Beneath the valve seat 16, the casing is provided with a cylindrical throat 25. A bottom extension 26 of the guide-element 22 has fins 27 projecting laterally therefrom and terminating adjacent the cylindrical interior surface of the throat 25.

A restricted port 28 in the cylindrical body 17 faces the inlet port 8, and communicates with an upright passage 29 in the body. The passage 29 is narrowed at the bottom to provide a seat 30 for a ball 31. In its upper portion the passage 29 communicates with a transverse passage 32, which, at its opposite end, opens into an upright passage 33, terminating in a cylindrical chamber 34 at the bottom of the body. Centrally of the transverse passage 32 an upright port 35 is provided, which, at its lower end, communicates with a passage 36 extending transversely to the transverse passage 32. At its ends the passage 36 communicates with upright ports 37 in which hollow screws 38 are fitted, the openings in the screws communicating with the control chamber 12.

The port 35 is widened above the transverse passage 32, and a ball 39 seats in the port 35 at its junction 41 with the transverse passage 32. A small bleed opening in the form of a notch 40 in the seat 41, permits a circulation of water past the ball valve 39. When pressure on the under side of the ball 39 is greater than the pressure above same, the ball will be raised from its seat 41 and may enter the widened portion of the port 35.

The cylindrical body 17 is intended to reciprocate in the control chamber 12, and on its top surface is provided with a pair of oppositely curved cup washers 42 and 43 of flexible material, which are clamped on the body 17 by means of a retaining plate 44 apertured at 45 to receive the hollow screws 38. The cup washers 42 and 43 form a shoulder exposed to the pressure of water entering the casing thru the inlet 8, which provides a fluid-tight closure for the control chamber.

The chamber 34 at the bottom of the body 17 is closed by a tilt valve 46 seated on the washer 20. A coil spring 48 bears against the valve 46 and aids the water pressure and gravitational force in holding the valve 46 in fluid-tight engagement with the washer 20. A stem 49 projects downwardly from the valve 46 thru an opening 50 in the extension 26 of the guide-element 22.

For operating the tilt valve 46 to effect the opening of the flushing valve, a handle 51 fulcrumed in an end of a housing 52, attached to the casing 7, actuates a pushrod 53 slidably supported in a gland 54 in the housing 52. A packing nut 55 on the gland 54 prevents leakage of water along the pushrod 53. A coil spring 56 between and bearing upon the gland 54 and a head 57 on the pushrod, effects a return of the pushrod to its normal position after the valve actuating movement. At its opposite end, the pushrod 53 terminates adjacent the stem 49, and when the handle 51 is rocked, the pushrod 53 strikes the stem 49, thereby unseating the valve 46.

Between the valve seat 16 and the outlet 9, the casing has an enlargement forming a cylindrical chamber 58, inclined relative to the upright portion of the casing 7 and in open communication with the outlet 9. At its upper end the chamber 58 is open to the atmosphere, the opening 59 being restricted to provide a seat 47 for a valve 60, carrying a washer 61 for engagement with the seat. The washer is held in place on the valve by a headed screw 62. The valve 60 has a stem 63 slidably fitted in a socket 64, in a nut 65 fastened in the lower end of the chamber 58, which guides the piston in its movement in the chamber. A moat 66 in the nut 65 surrounds the socket 64.

A lever 67 pivoted on a fulcrum pin 68 in the casing 7 has a head 69 engaging a concavity 70 of the valve 60. The opposite end of the lever 67 is forked to extend around the stem 49, the forked portions being laterally widened to form wings 71.

When the valve 60 is held against the seat 47, the restricted opening 59 forms a cup, capable of retaining small quantities of water, in a manner to be hereinafter explained.

In operation, the pressure of the water entering the inlet 8 from a water main with which it is connected, and passing thru the restricted port 28, unseats the ball 31, the water flowing thru the upright passage 29, into transverse passage 32, and thru the upright passage 33 until the chamber 34 is filled. The notch 40 permits the water to flow thru upright port 35, thru the lateral passage 36, and pass upwardly thru the ports 37 and hollow screws 38 into the control chamber 12.

Continued pressure from the water main (not shown) completely fills the control chamber, with the result that the piston 13 is firmly held on the seat 16.

Manual movement of the handle 51 drives the push-rod 53 against the stem 49 with sufficient force to tilt the valve 46 against the resistance of its spring 48 and permit the escape of water from the chamber 34 thru the opening 50 in guide-element 22. This results in pressure changes in the cylindrical body 17, the pressure of the water passing thru the restricted port 28 being less than the pressure in the transverse passage 32, whereupon the ball 39 is unseated and water from the control chamber begins to flow into the transverse passage 32.

With the removal of water from the control chamber 12, the pressure of the water coming thru inlet port 8 and directed against the shoulder formed by the cup washer 42 lifts the piston until its upward movement is arrested by the stop 15. With the raising of the piston, the flow of water from the main passes thru throat 25, and outlet 9 into the fixture to be flushed.

The spring 56 returns the pushrod 53 to its normal position after removal of pressure on the handle 51; and the spring 48 thereupon reseats tilt valve 46. The pressure of the water passing thru the restricted port 28 then raises the valve 31 from its seat, and filling of the control chamber proceeds as hereinabove described. As the chamber 12 fills, the cylindrical body 17 descends until it again rests on seat 16. From the foregoing, it is apparent that the operation of the valve is automatic, subject to a continuous water pressure, after the initial manual operation of the handle.

The operation thus far described concerns the normal control of the valve. It sometimes happens that, due to the failure of the water supply or excessive withdrawal of water at a point below the valve, a partial vacuum will be formed in the supply pipe, and if the valve outlet is submerged, as it sometimes will be if the fixture is clogged, water will syphon from the bowl into the water supply pipes.

The prevailing practice in the art, relied on to eliminate this defect, is the provision of an air inlet, normally closed by a valve, which is lifted off its seat by the reverse pressure to admit air for the purpose of destroying the partial vacuum. The main difficulty with such structures has been that the valve, thru constant pressure on its seat for long periods of time, sticks to its seat when it is needed to function, and thus becomes inoperative.

In most constructions, the air inlet is relatively small and only small quantities of air are admitted, so that when considerable reverse pressure has developed, the volume of air is insufficient to check the back pressure.

Likewise, check valves are employed to keep a piston pressed against a seat, but owing to defects and deterioration of the seats and washers, and the admission of sand and other solids which work in between the valve and its seat, these structures are not dependable.

In the present invention, when the flushing action begins, water descending to the outlet 9 falls upon the wings 71 of the lever 67, moving the valve 60 to a closed position, so that the water will not escape thru the opening 59. If the valve 60 is leaky and small amounts of water escape, the cup formed by the restricted opening 59 when the valve 60 engages the seat 47, retains the water until the valve reopens, when the water will run down into outlet 9.

When the force directed against the wings 71 is terminated, either from discontinuance of the flushing operation, or by reason of a reverse flow in the casing 7, the lever 67 returns to its normal position by reason of the gravitational movement of the valve 60, and a free flow of air enters the casing 7 thus preventing water from being raised by suction due to the presence of a partial vacuum in the supply pipes. In this connection it will be observed that relatively large volumes of air, proportionate to the size of the valve, are admitted, so that any suction which might develop will be instantly broken.

The valve has a further safeguard against pollution of the water supply from a reverse flow therethrough, in the provision of the ball valve 31 in the upright passage 29. It is readily apparent that if a partial vacuum is formed in the supply pipes for any reason the ball 31 will be forced against the seat 30 and held firmly thereon as long as this condition exists, thereby retaining the water in the control chamber and preventing the piston from moving off its seat. Passage of polluted water through the valve and contamination of the water supply is thus prevented.

Variations in the construction and arrangement of the constituent parts of the valve may be resorted to within the spirit of the invention, as defined in the hereunto appended claims.

What I claim and desire to secure by Letters Patent is:

1. A flush valve comprising a casing having an inlet and an outlet, there being a valve seat between the inlet and the outlet, a piston valve movably fitted in the casing and cooperating with the seat to control the flow of water between the inlet and the outlet, the piston defining a control chamber at a side thereof, the control chamber being normally filled with water to hold the piston on its seat, a passageway between the chamber and the outlet, a tilt valve controlling the passageway, a stem on the tilt valve, the casing having an enlargement providing an air-intake chamber, a valve controlling the air-intake, a lever having an end engaging the valve and having its opposite end bifurcated, the stem being disposed between the bifurcations of the lever, and a manually-operable pushrod for engaging the stem to unseat the tilt valve and thereby effect an opening movement of the piston valve to establish communication between the inlet and the outlet.

2. A flush valve comprising a casing having an inlet and an outlet, there being a valve seat between the inlet and the outlet, a piston valve movably fitted in the casing and cooperating with the seat to control the flow of water between the inlet and the outlet, the piston defining a control chamber at one end thereof, and having a valve-controlled passageway for admitting water to the control chamber from the inlet, a second passageway extending from the first passageway to the outlet, means comprising a tipple valve in the second passageway, for controlling the flow of water from the control chamber to the outlet, and a port common to both passageways, a ball seated in the port, there being a notch in the surface engaged by the ball to permit a restricted flow of water thru the port to the control chamber, and manually-operable means to effect an opening movement of the tipple valve and thereby permit the piston valve to move from its seat to establish communication between the inlet and the outlet.

3. In combination with a water supply system subjected to pressure variations above and below atmospheric and provided with means comprising a valve having a stem, for controlling the flow of water from and into the system, a conduit extending from the valve mechanism and having one end forming a discharge outlet the valve stem extending into the conduit, the wall of the conduit having an air-intake opening, means comprising a movable valve member for closing the air-intake, the movable valve member being normally in open position, and means comprising a lever, pivoted to the conduit, having a connection with the movable valve member, and having a portion positioned in the conduit in position to be acted upon by the flow of water from the supply system to the discharge outlet, provided with a guide opening through which the valve stem extends, for moving the valve member to closed position when water is discharging from the system.

4. In a flush valve mechanism of the type having a control valve and a conduit extending from the valve to a fixture whereby the fixture may be flushed by operation of the control valve, the combination with a normally open air inlet valve in communication with said conduit comprising an upwardly inclined cylinder in communication with the conduit, the upper end of the cylinder being open, and provided with a valve seat, a tappet valve positioned in the cylinder for longitudinal movement towards and from the valve seat, a stem on the valve, and means for closing the valve operable by the force of liquid flowing through said conduit.

5. In a flush valve mechanism of the type having a control valve and a conduit extending from the valve to a fixture whereby the fixture may be flushed by operation of the control valve, the combination with a normally open air inlet valve in communication with said conduit comprising an upwardly inclined cylinder in communication with the conduit, the upper end of the cylinder being open and provided with a valve seat, a tappet valve positioned in the cylinder for movement towards and from the valve seat along the axis of the cylinder, means for guiding the valve, and means for closing the valve operable by the force of liquid flowing through said conduit, said means comprising a lever pivoted intermediate its ends, one end of the lever projecting under the valve and the other projecting into the conduit to be engaged by liquid flowing therein.

6. A flush valve comprising, a housing having an inlet and an outlet, there being a valve seat between the inlet and the outlet, a flushing-valve fitted in the housing and cooperating with the seat to control the flow of fluid therethrough, a chamber communicating with the housing on the outlet-side thereof, the chamber having a normally-open air-port, a valve in the chamber controlling the passage of air through the air-port, and mechanism in the chamber extending into the housing in a position to be acted upon by a flow of fluid therethrough to close the air-port during the fluid-flow.

7. A flush valve comprising, a housing having an inlet and an outlet, there being a valve seat between the inlet and the outlet, a flushing-valve fitted in the housing and cooperating with the seat to control the flow of fluid therethrough, a chamber communicating with the housing on the outlet-side thereof, the chamber having a normally-open air-port, a tappet valve in the chamber cooperating with the air-port, a stem on the valve, and a lever in the chamber extending into the housing in a position to be acted upon by a flow of fluid therethrough to close the air-port during the fluid-flow.

8. A flush valve comprising a casing having an inlet and an outlet, and valve means controlling flow therebetween, a control chamber for said valve means, a passageway between said chamber and the outlet, a tilt valve controlling said passageway and having a stem projecting through the passageway, said casing having an air intake chamber, a valve controlling said air intake chamber, a lever having one end engaging said air intake valve and having its opposite end bifurcated, said lever being positioned with the bifurcations extending about the stem of said tilt valve, and means to engage said stem to unseat the tilt valve and thereby effect an opening movement of said first, main flow controlling valve means.

9. A flush valve comprising a casing having an inlet and an outlet, and valve means controlling flow therebetween, a control chamber for said valve means, means to control pressures within said control chamber whereby to effect an opening movement of said flow controlling valve means, said casing having an air intake chamber, a valve controlling said air intake chamber and control means for said air intake valve effective upon opening movement of said flow controlling valve means to close said air intake valve, and means to close said air intake valve when said flow controlling valve means effects a closing movement, thereby establishing communication between the interior of said casing and the atmosphere at all times except when said flow controlling valve means is open.

10. An air inlet valve mechanism for flush valve systems comprising a conduit for flow of fluid, an inclined enlargement in said conduit providing a normally open air inlet to the conduit, the opening thereof being at the upper end of said enlargement, a stemmed valve operable in said enlargement, means therein to guide said valve, operating means for said valve comprising a lever pivoted intermediate its ends between said enlargement and said conduit, one end of said lever being formed with a rounded portion engageable with the under side of said valve, and the other end of said lever being formed with a vane projecting into the path of flow through the conduit, whereby said valve will close during flow of fluid through the conduit, said valve being weighted for gravitational reopening upon cessation of flow.

11. An air inlet valve mechanism for flush valve systems comprising a conduit for flow of fluid, an inclined enlargement in said conduit providing a normally open air inlet to the conduit, the opening thereof being at the upper end of said enlargement, a stemmed valve operable in said enlargement, means therein to guide said valve, control means for said valve operable in accordance with flow conditions through said conduit, and means to trap seepage past said valve during flow of fluid through the conduit, the lower wall of said enlargement being downwardly inclined to facilitate drainage into said conduit upon reopening of said valve.

12. A flush valve according to claim 6, in which there is a valve seat provided by the airport in the chamber, and a valve mounted in the chamber and acted on by the mechanism for movement into and out of engagement with said seat.

13. A flush valve according to claim 6, in which the mechanism includes a lever having a part acting on the valve for closing the same, and another part positioned in the housing for movement by the flow of liquid through the same.

14. A flush valve according to claim 6, in which the air port in the chamber is elevated with respect to the zone of communication between such chamber and the housing.

15. A flush valve according to claim 6, in which the air port in the chamber is elevated with respect to the zone of communication between such chamber and the housing, and provides a valve seat in the chamber, and a valve is mounted in the chamber for movement into and out of engagement with the seat, and in which the mechanism includes a lever having one end engaging the valve and its opposite end disposed in the housing in the path of the flow therethrough, whereby said valve will be closed by the lever during flow of fluid through the housing.

16. A flush valve according to claim 6, in which the air port in the chamber is elevated with respect to the zone of communication between such chamber and the housing, and provides a valve seat in the chamber, and a valve is mounted in the chamber for movement into and out of engagement with the seat, and in which the mechanism includes a lever having one end engaging the valve and its opposite end disposed in the housing in the path of the flow therethrough, whereby said valve will be closed by the lever during flow of fluid through the housing, and in which the valve in the air port chamber is weighted for gravitational re-opening upon cessation of flow.

17. A flush valve according to claim 6, in which the mechanism includes a lever pivoted intermediate its ends with one end engaging the air port valve to control movements thereof and its opposite end disposed in the housing and provided with means resistant to the flow therethrough.

18. A flush valve according to claim 6, in which the air port valve is a tappet valve mounted in the chamber for rectilinear movement to control the flow of air through the air port.

WILLIAM S. WHITE.